(12) United States Patent
Kawanago et al.

(10) Patent No.: US 11,960,200 B2
(45) Date of Patent: Apr. 16, 2024

(54) LENS DEVICE, IMAGING APPARATUS, IMAGING METHOD, AND IMAGING PROGRAM FOR ACQUIRING MULTISPECTRAL IMAGES

(71) Applicant: FUJIFILM Corporation, Tokyo (JP)

(72) Inventors: Atsushi Kawanago, Saitama (JP); Kazuyoshi Okada, Saitama (JP); Yasunobu Kishine, Saitama (JP); Yuya Hirakawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/328,757

(22) Filed: Jun. 4, 2023

(65) Prior Publication Data

US 2024/0019762 A1     Jan. 18, 2024

Related U.S. Application Data

(63) Continuation of application No. 17/862,408, filed on Jul. 12, 2022, now Pat. No. 11,726,389, which is a (Continued)

(30) Foreign Application Priority Data

Jan. 31, 2020 (JP) ................................. 2020-015551

(51) Int. Cl.
    | | |
    |---|---|
    | *H04N 5/335* | (2011.01) |
    | *G02B 5/20* | (2006.01) |
    | *G02B 27/28* | (2006.01) |
    | *G03B 9/04* | (2021.01) |
    | *G03B 11/00* | (2021.01) |
    | *H04N 23/55* | (2023.01) |

(Continued)

(52) U.S. Cl.
CPC .............. *G03B 9/04* (2013.01); *G02B 5/201* (2013.01); *G02B 27/288* (2013.01); *G03B 11/00* (2013.01);

(Continued)

(58) Field of Classification Search
CPC ...................................................... G03B 11/00
See application file for complete search history.

(56) References Cited

U.S. PATENT DOCUMENTS

| | | |
|---|---|---|
| 8,749,696 B2 | 6/2014 | Goto |
| 9,658,463 B2 | 5/2017 | Imamura et al. |

(Continued)

FOREIGN PATENT DOCUMENTS

| | | |
|---|---|---|
| CN | 102289131 | 12/2011 |
| CN | 103460024 | 12/2013 |

(Continued)

OTHER PUBLICATIONS

"Notice of Reasons for Refusal of Japan Counterpart Application", dated Aug. 18, 2023, with English translation thereof, p. 1-p. 10.

(Continued)

*Primary Examiner* — Gary C Vieaux
(74) *Attorney, Agent, or Firm* — JCIPRNET

(57) ABSTRACT

A lens device includes an imaging optical system and an optical member. The optical member is disposed near a pupil of the imaging optical system in a state where an optical axis of the optical member coincides with an optical axis of the imaging optical system. The optical member includes a frame that includes a plurality of aperture regions, a plurality of optical filters that are disposed in at least one of the plurality of aperture regions and include two or more optical filters transmitting light having at least some wavelength ranges different from each other, and a plurality of polarizing filters that are disposed in at least one of the plurality of aperture regions and have different polarization directions. The lens barrel has a slit, and the optical member is insertable into and removable from the imaging optical system through the slit.

19 Claims, 19 Drawing Sheets

Related U.S. Application Data continuation of application No. PCT/JP2021/002356, filed on Jan. 25, 2021.

(51) Int. Cl.
*H04N 23/71* (2023.01)
*H04N 23/75* (2023.01)
*H04N 25/11* (2023.01)

(52) U.S. Cl.
CPC ............ *H04N 23/55* (2023.01); *H04N 23/71* (2023.01); *H04N 23/75* (2023.01); *H04N 25/11* (2023.01)

(56) References Cited

U.S. PATENT DOCUMENTS

| 10,264,953 | B2 | 4/2019 | Kosugi et al. |
| 2013/0338439 | A1 | 12/2013 | Kosugi et al. |
| 2015/0130962 | A1 | 5/2015 | Hiramoto et al. |
| 2016/0037021 | A1 | 2/2016 | Narumi |
| 2022/0236463 | A1* | 7/2022 | Kishine .................. G03B 11/00 |

FOREIGN PATENT DOCUMENTS

| CN | 103513440 | 1/2014 |
| JP | 2009284188 | 12/2009 |
| JP | 2012247645 | 12/2012 |
| JP | 2014003461 | 1/2014 |
| JP | 2016036024 | 3/2016 |
| JP | 2016082325 | 5/2016 |
| WO | 2014020791 | 2/2014 |

OTHER PUBLICATIONS

"Office Action of China Counterpart Application", dated Aug. 25, 2023, with English translation thereof, p. 1-p. 18.

Office Action of China Counterpart Application, with English translation thereof, issued on Jan. 26, 2024, pp. 1-17.

* cited by examiner

FIG. 7B
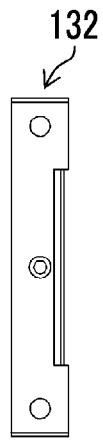
FIG. 7E
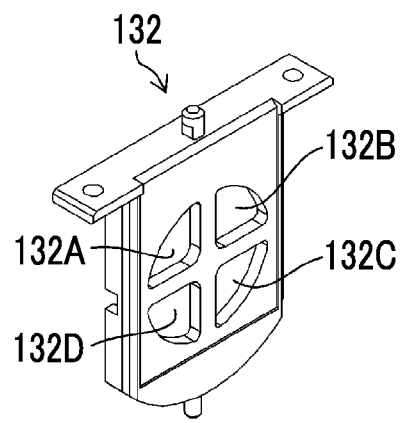
FIG. 7A
FIG. 7C
FIG. 7F
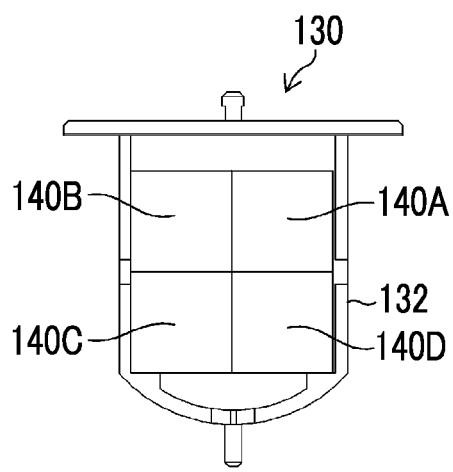
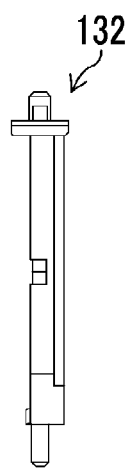
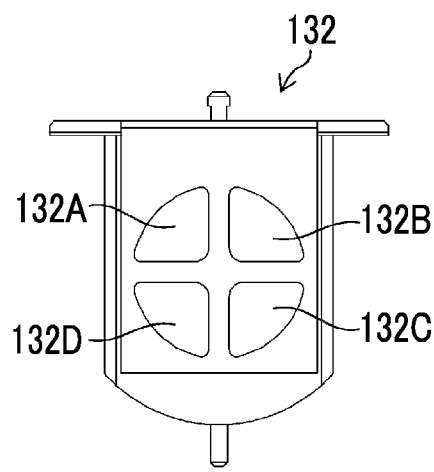
FIG. 7D
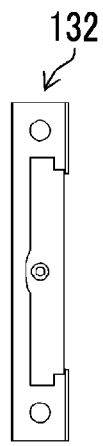

LENS DEVICE, IMAGING APPARATUS, IMAGING METHOD, AND IMAGING PROGRAM FOR ACQUIRING MULTISPECTRAL IMAGES

CROSS-REFERENCE TO RELATED APPLICATIONS

The present application is a continuation application of and claims the priority benefit of U.S. patent application Ser. No. 17/862,408, filed on Jul. 12, 2022. The U.S. patent application Ser. No. 17/862,408 is a Continuation of PCT International Application No. PCT/JP2021/002356 filed on Jan. 25, 2021 claiming priority under 35 U.S.C § 119(a) to Japanese Patent Application No. 2020-015551 filed on Jan. 31, 2020. Each of the above applications is hereby expressly incorporated by reference, in its entirety, into the present application.

BACKGROUND OF THE INVENTION

1. Field of the Invention

The present invention relates to a lens device, an imaging apparatus, an optical member, an imaging method, and an imaging program that are used to take multispectral images.

2. Description of the Related Art

With regard to a technique for taking multispectral images, for example, WO2014/020791A discloses a polarization color imaging apparatus that can perform multispectral imaging by using a polarization sensor and pupil division.

SUMMARY OF THE INVENTION

One embodiment of a technique of the present disclosure provides a lens device, an imaging apparatus, an imaging method, and an imaging program that can easily acquire multispectral images having a good image quality.

A lens device according to a first aspect of the present invention comprises: an imaging optical system that includes a lens forming an optical image of a subject, and a lens barrel in which the lens is disposed; and an optical member that is disposed near a pupil of the imaging optical system in a state where an optical axis of the optical member coincides with an optical axis of the imaging optical system, and includes a frame that includes a plurality of aperture regions, a plurality of optical filters that are disposed in at least one of the plurality of aperture regions and include two or more optical filters transmitting light having at least some wavelength ranges different from each other, and a plurality of polarizing filters that are disposed in at least one of the plurality of aperture regions and have different polarization directions, wherein the lens barrel has a slit at a position near the pupil of the imaging optical system, and the optical member is insertable into and removable from the imaging optical system through the slit.

According to a second aspect, the lens device according to the first aspect further comprises an adjustment member that is disposed in at the least one aperture region and adjusts an aperture area of the aperture region.

According to a third aspect, in the lens device according to the second aspect, the adjustment member is disposed in the plurality of aperture regions.

According to a fourth aspect, in the lens device according to the second or third aspect, the adjustment member makes the aperture area variable.

According to a fifth aspect, the lens device according to any one of the first to fourth aspects further comprises a dark filter that is disposed in at least one aperture region of the plurality of aperture regions and dims light transmitted through the at least one aperture region.

According to a sixth aspect, in the lens device according to the fifth aspect, the dark filter is disposed in each of the plurality of aperture regions.

According to a seventh aspect, in the lens device according to the fifth or sixth aspect, a degree of dimming of the dark filter is variable.

According to an eighth aspect, in the lens device according to any one of the fifth to seventh aspects, the optical member is an optical member in which the optical filters and the polarizing filters are fixed to the plurality of aperture regions, and the dark filter is inserted into at least one aperture region of the plurality of aperture regions.

An imaging apparatus according to a ninth aspect of the present invention comprises: the lens device according to any one of the first to eighth aspects; an imaging element that includes a plurality of polarizing elements having polarization directions corresponding to the polarization directions of the plurality of polarizing filters and a plurality of pixel groups selectively receiving light transmitted through any one of the plurality of aperture regions; and a processor that generates a plurality of images corresponding to the wavelength ranges of the plurality of optical filters, respectively, on the basis of a plurality of image signals output from the imaging element.

According to a tenth aspect, in the imaging apparatus according to the ninth aspect, the processor calculates a light amount ratio between the wavelength ranges on the basis of the plurality of image signals.

According to a eleventh aspect, in the imaging apparatus according to the tenth aspect, the processor prompts a user to improve the light amount ratio in a case where the light amount ratio is lower than a threshold value.

According to a twelfth aspect, in the imaging apparatus according to the tenth aspect, the processor adjusts the amount of light emitted from the plurality of aperture regions on the basis of the light amount ratio.

According to an thirteenth aspect, the imaging apparatus according to tenth aspects further comprises a plurality of shielding members that correspond to the plurality of aperture regions, respectively, and shield aperture regions other than a specific aperture region among the plurality of aperture regions. The processor calculates the light amount ratio on the basis of the plurality of images that are acquired in a state where any one of the plurality of shielding members is mounted on the lens device.

According to a fourteenth aspect, in the imaging apparatus according to any one of the ninth aspects, the imaging element is provided with a plurality of color filters having wavelength ranges corresponding to the wavelength ranges of the plurality of optical filters, and the processor combines the plurality of images. The processor may combine all of a plurality of images corresponding to the plurality of image signals, or may combine some images. Further, the processor may combine the plurality of images to generate a color image.

An imaging method according to a fifteenth aspect of the present invention is an imaging method for an imaging apparatus including the lens device according to the first to fourteenth aspects, and an imaging element that includes a plurality of polarizing elements having polarization directions corresponding to the polarization directions of the plurality of polarizing filters and a plurality of pixel groups selectively receiving light transmitted through any one of the plurality of aperture regions. The imaging method comprises an image generation step of generating a plurality of images corresponding to the wavelength ranges of the plurality of optical filters, respectively, on the basis of a plurality of image signals output from the imaging element.

According to a sixteenth aspect, the imaging method according to the fifteenth aspect further comprises an information calculation step of calculating a light amount ratio between the wavelength ranges on the basis of the plurality of image signals.

According to a seventeenth aspect, the imaging method according to the sixteenth aspect further comprises an improvement request step of prompting a user of the imaging apparatus to improve the light amount ratio in a case where the light amount ratio is lower than a threshold value.

According to a eighteenth aspect, the imaging method according to the sixteenth aspect further comprises a light amount-adjustment step of adjusting the amount of light emitted from the plurality of aperture regions on the basis of the light amount ratio.

An imaging program according to a nineteenth aspect of the present invention causes a computer to execute the imaging method according to any one of the fifteenth to eighteenth aspects.

BRIEF DESCRIPTION OF THE DRAWINGS

FIGS. 7A to 7F are diagrams showing the appearance of a frame.

DESCRIPTION OF THE PREFERRED EMBODIMENTS

A lens device, an imaging apparatus, an optical member, an imaging method, and a program according to an embodiment of the present invention are as follows. In the description, the accompanying drawings will be referred as necessary.

First Embodiment

<Configuration of Imaging Apparatus>

Figure 1:
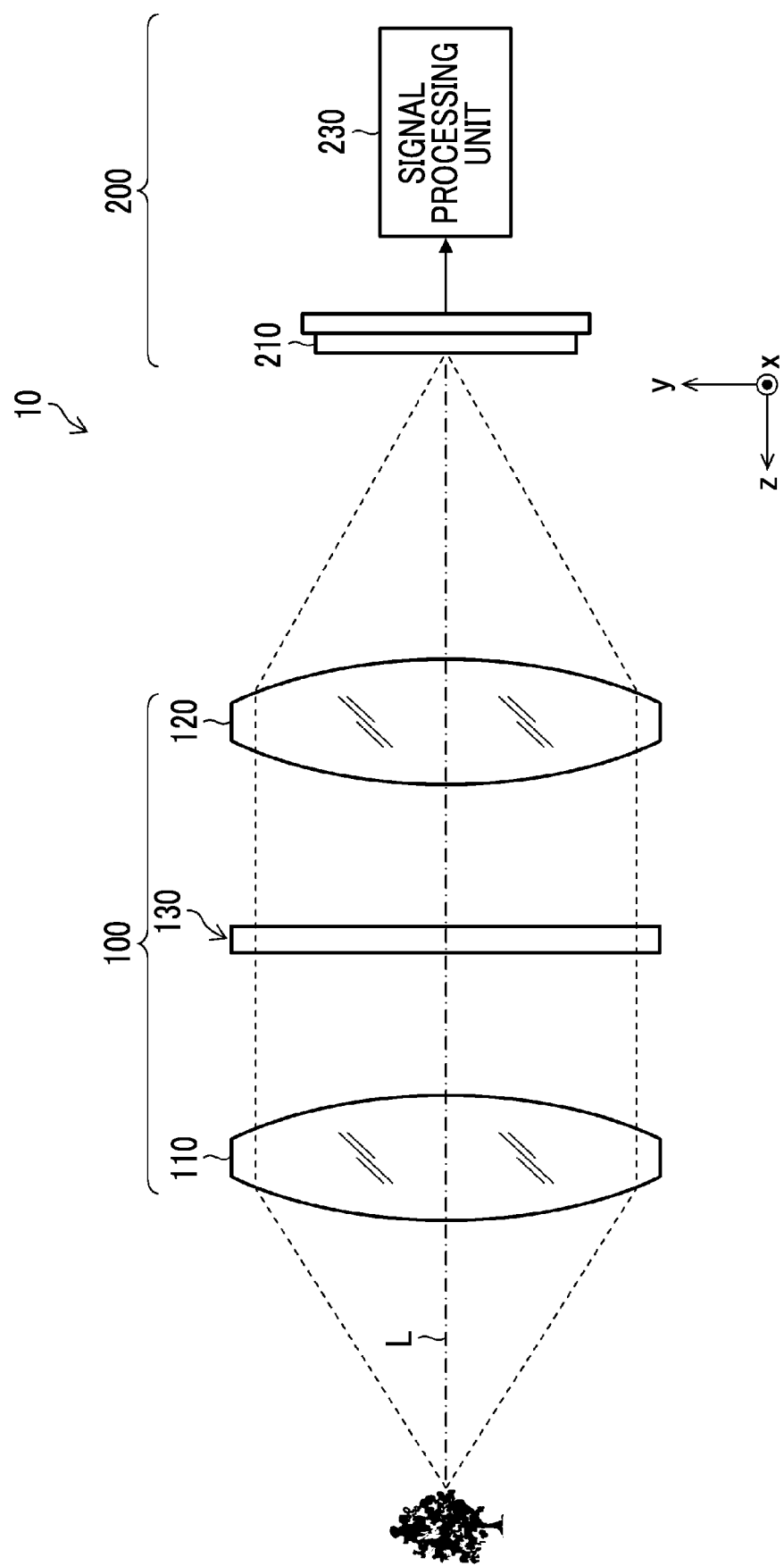
FIG. 1 is a diagram showing the schematic configuration of an imaging apparatus according to a first embodiment.

FIG. 1 is a diagram showing the schematic configuration of an imaging apparatus according to a first embodiment. The imaging apparatus 10 (imaging apparatus) according to the first embodiment is an imaging apparatus that takes multispectral images, and mainly comprises a lens device 100 (a lens device, an imaging optical system) and an imaging apparatus body 200 (an imaging apparatus, an imaging element, a processor). The imaging apparatus body 200 comprises an imaging element 210 (imaging element) and a signal processing unit 230 (a signal processing unit, a processor).

<Configuration of Imaging Element>

Figure 2:
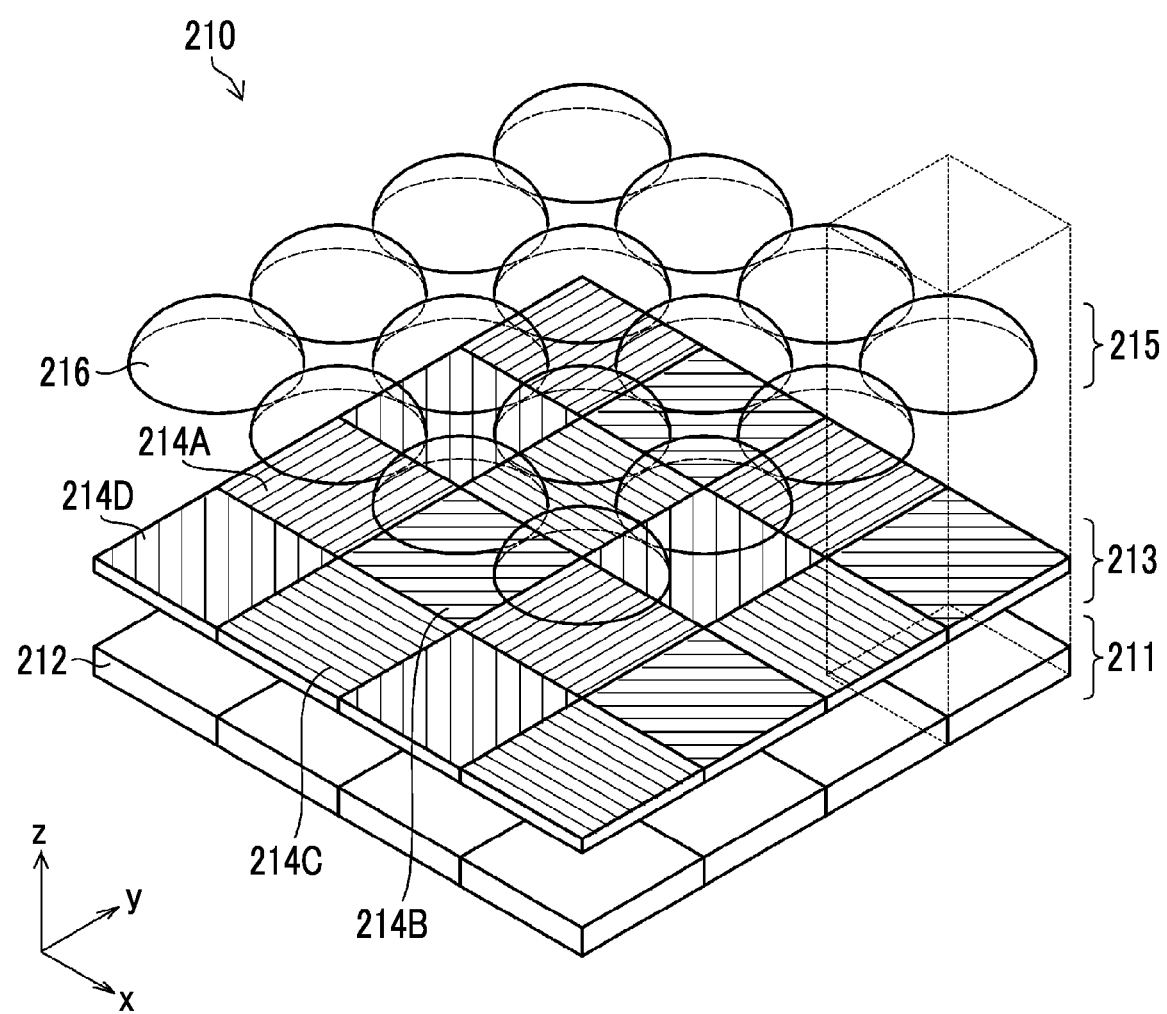
FIG. 2 is a diagram showing the schematic configuration of an imaging element.
Figure 3:
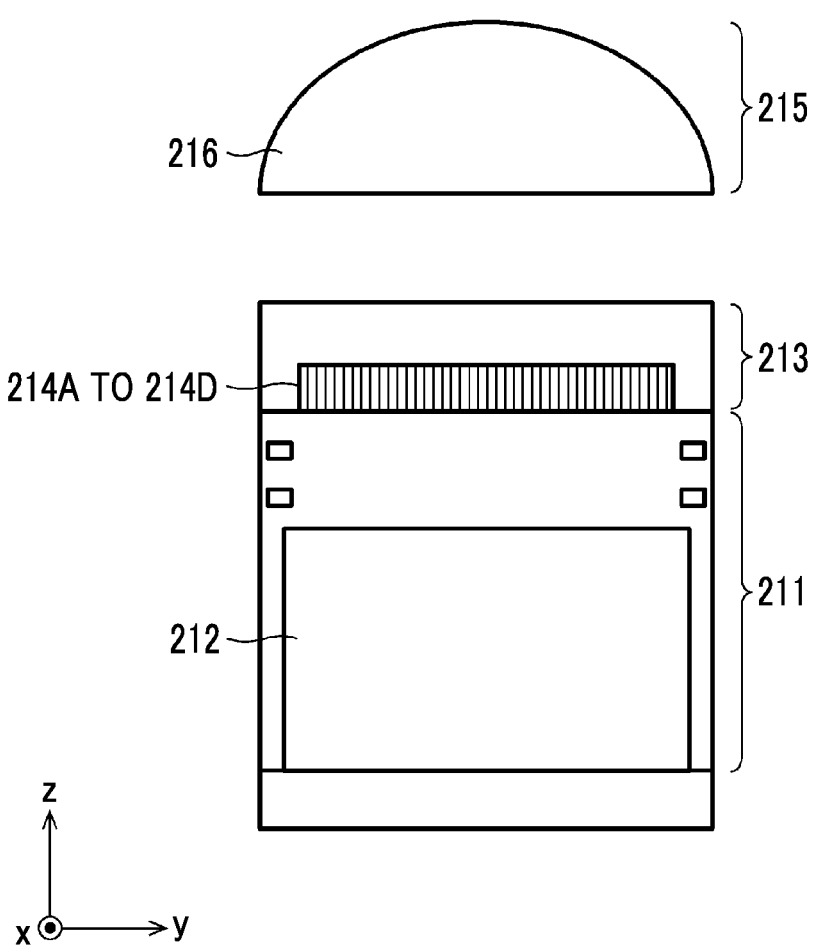
FIG. 3 is a cross-sectional view showing the schematic configuration of one pixel shown in FIG. 2 (a portion shown in FIG. 2 by a broken line).

FIG. 2 is a diagram showing the schematic configuration of the imaging element 210, and FIG. 3 is a cross-sectional view showing the schematic configuration of one pixel shown in FIG. 2 (a portion shown in FIG. 2 by a broken line). The imaging element 210 is a complementary metal-oxide semiconductor (CMOS) type imaging element (image sensor), and is a monochrome imaging element that includes a pixel array layer 211, a polarizing filter element-array layer 213, and a microlens array layer 215. The respective layers are arranged in order of the pixel array layer 211, the polarizing filter element-array layer 213 (a plurality of polarizing elements), and the microlens array layer 215 from an image plane side toward an object side. The imaging element 210 is not limited to a CMOS type imaging element and may be an XY address type imaging element or a Charge Coupled Device (CCD) type image sensor.

The pixel array layer 211 has a configuration in which a lot of photodiodes 212 (a plurality of pixel groups) are two-dimensionally arranged. One photodiode 212 forms one pixel. The respective photodiodes 212 are regularly arranged in a horizontal direction (x direction) and a vertical direction (y direction).

The polarizing filter element-array layer 213 has a configuration in which four types of polarizing filter elements 214A, 214B, 214C, and 214D (a plurality of polarizing elements) having different polarization directions (the polarization directions of light to be transmitted) are two-dimensionally arranged. The polarization directions of the polarizing filter elements 214A, 214B, 214C, and 214D can be set to, for example, 0°, 45°, 90°, and 135°. Further, these polarization directions can be made to correspond to the polarization directions of polarizing filters of an optical member (see FIGS. 10A to 10D). Due to these polarizing filter elements 214A to 214D, the imaging element 210 includes a plurality of image groups, each of which selectively receive any one of pieces of light transmitted through a plurality of aperture regions. These polarizing filter elements 214A and 214D are arranged at the same intervals as the photodiodes 212, and are provided in pixels, respectively.

The microlens array layer 215 comprises microlenses 216 that are arranged in the respective pixels.

<Configuration of Image Generation Unit>

Figure 4:
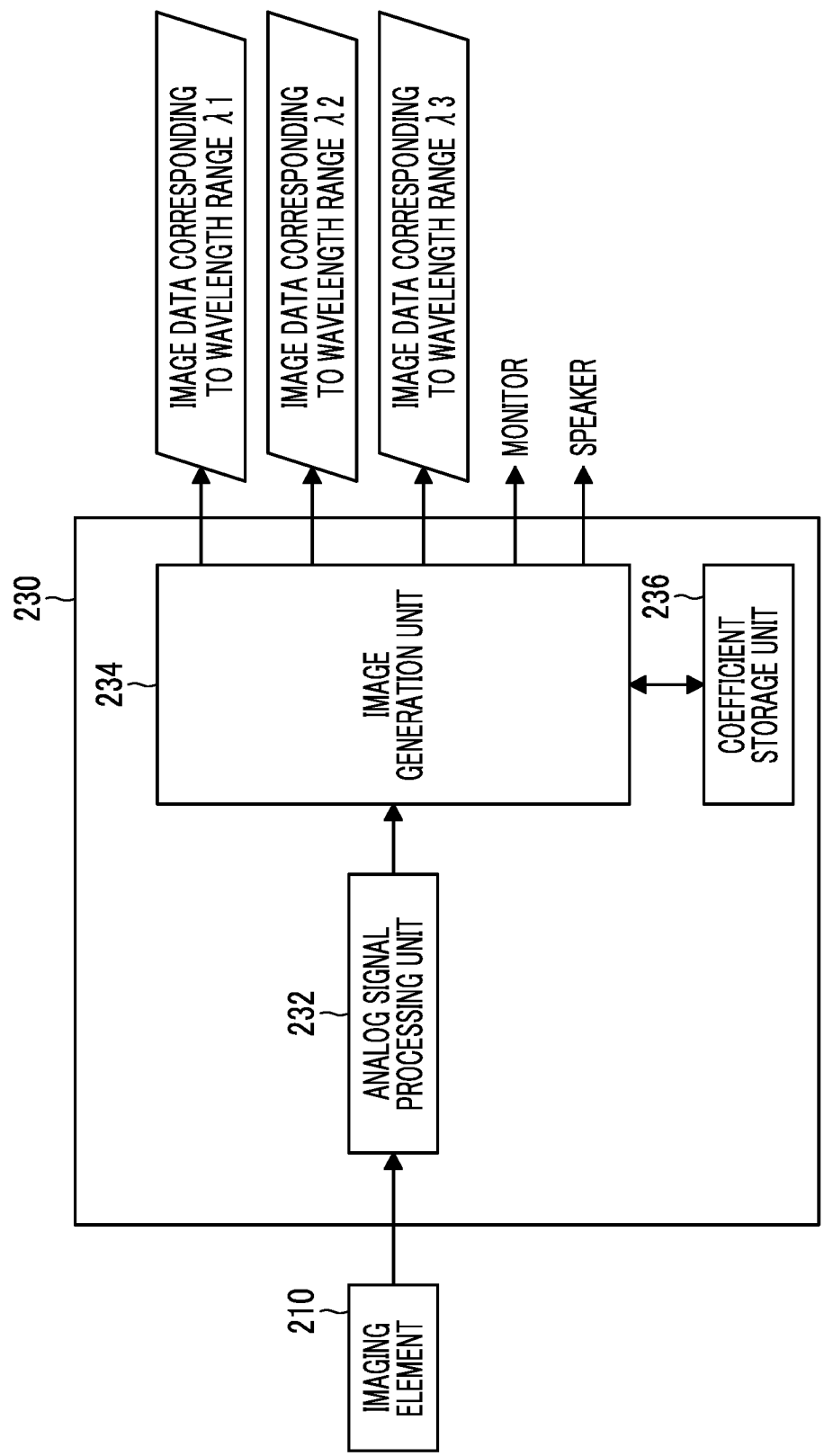
FIG. 4 is a diagram showing the configuration of an image generation unit.

FIG. 4 is a diagram showing the configuration of an image generation unit. The signal processing unit 230 comprises an analog signal processing unit 232 that performs analog signal processing on signals output from the imaging element, an image generation unit 234, and a coefficient storage unit 236. The image generation unit 234 (processor) comprises a non-transitory recording medium (not shown), such as a read only memory (ROM), in which computer readable codes of an imaging program causing a computer to perform an imaging method according to an embodiment of the present invention are recorded, and a transitory storage region (not shown) for work; and generates a plurality of images, which correspond to the wavelength ranges of a plurality of optical filters (see FIG. 8 and the like) arranged in the lens device 100, on the basis of a plurality of image signals output from the imaging element 210 (image signals corresponding to the different polarization directions). The image generation unit 234 can generate images (three-band multispectral images) having wavelength ranges $\lambda 1$, $\lambda 2$, and $\lambda 3$. Further, the image generation unit 234 performs the calculation and/or adjustment of a light amount ratio, the output of a message that prompts a user to adjust a light amount ratio, and the like (described later).

The functions of the above-mentioned image generation unit 234 can be realized using various processors and recording mediums. The various processors also include, for example, a central processing unit (CPU) that is a general-purpose processor realizing various functions by executing software (program), a graphics processing unit (GPU) that is a processor specialized in image processing, and a programmable logic device (PLD) that is a processor of which circuit configuration can be changed after manufacture, such as a field programmable gate array (FPGA). Each function may be realized by one processor or may be realized by a plurality of processors of the same type or different types (for example, a plurality of FPGAs, a combination of a CPU and an FPGA, or a combination of a CPU and a GPU). Further, a plurality of functions may be realized by one processor. The hardware structures of these various processors are more specifically electrical circuitry where circuit elements, such as semiconductor elements, are combined.

In a case where the above-mentioned processors or electrical circuitry execute software (program), codes, which can be read by a computer (for example, various processors or electrical circuitry forming the image generation unit 234, and/or a combination thereof), of the software to be executed are stored in a non-transitory recording medium, such as ROM, and a computer refers to the software.

In a case where the imaging apparatus 10 receives an imaging instruction input from a shutter release switch (not shown) or the like, the imaging apparatus 10 performs the exposure control of the imaging element 210. The optical image of a subject, which is formed on the light-receiving surface of the imaging element 210 by this exposure control, is converted into electrical signals by the imaging element 210. Electric charge corresponding to the amount of light incident on the photodiode 212 is accumulated in each pixel of the imaging element 210, and electrical signals corresponding to the quantity of electric charge accumulated in each pixel are read out as image signals and output from the imaging element 210.

<Configuration of Lens Device>

Figure 5:
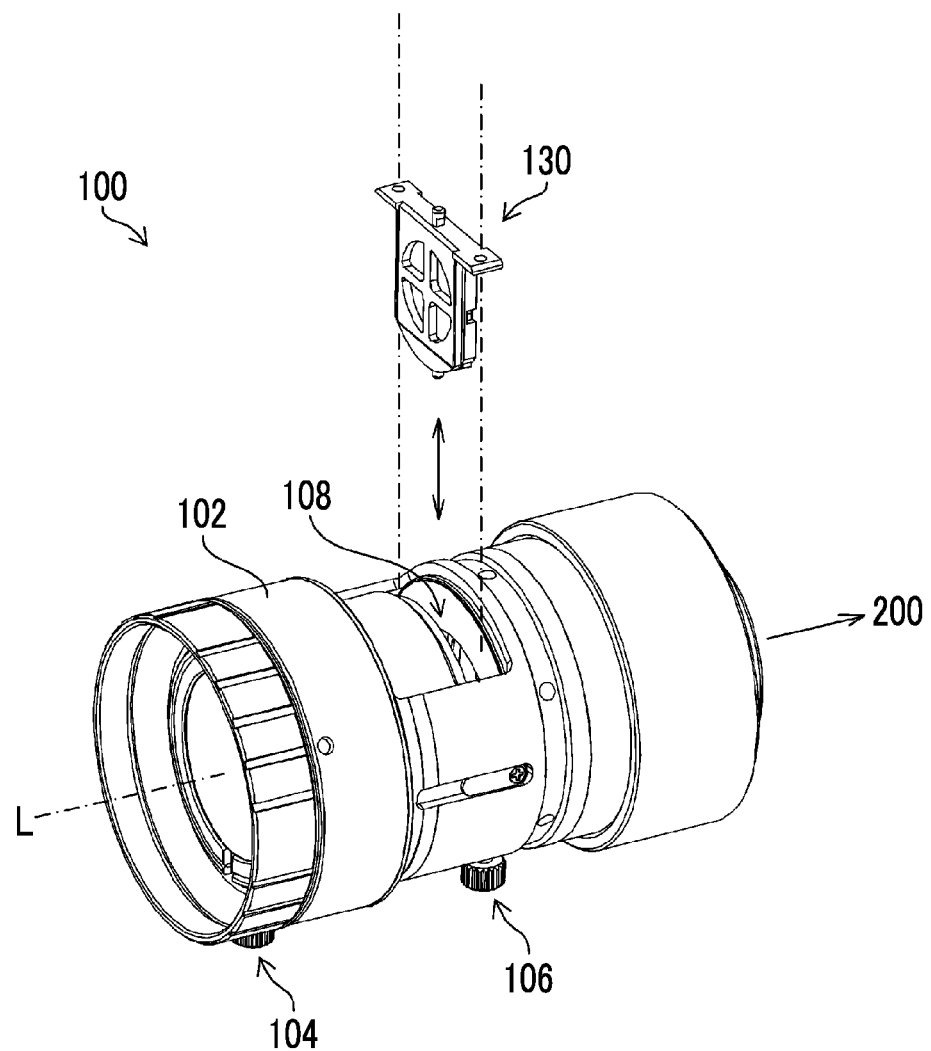
FIG. 5 is a perspective view showing the appearance of a lens device.
Figure 6:
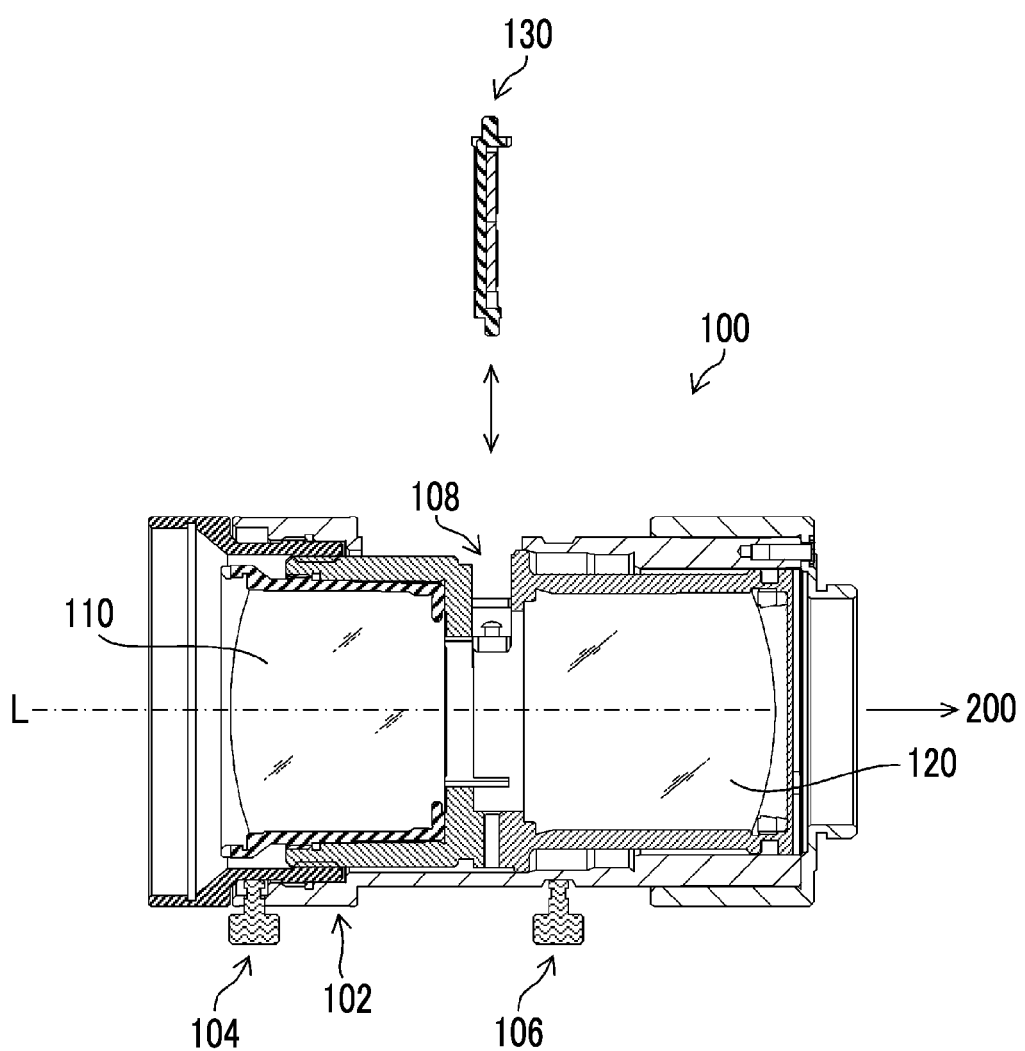
FIG. 6 is a cross-sectional view of the lens device taken in the direction of an optical axis.

FIG. 5 is a perspective view showing the appearance of the lens device 100, and FIG. 6 is a cross-sectional view of the lens device 100 taken in the direction of an optical axis L. As shown in FIGS. 5 and 6, a single imaging optical system composed of a first lens 110 (a lens, an imaging optical system) and a second lens 120 (a lens, an imaging optical system) is disposed in a lens barrel 102 of the lens device 100, and the lens groups are moved forward and backward in the direction of the optical axis L in a case where a first lever 104 and a second lever 106 are moved rotationally. As a result, a zoom and/or a focus is adjusted. Each of the first and second lenses 110 and 120 may be a lens group composed of a plurality of lenses. Further, in the lens barrel 102, a slit 108 is formed at the pupil position (near the pupil) of the lens device 100, and an optical member 130 (optical member) is inserted into the slit 108 and is disposed in a state where the optical axis of the optical member coincides with the optical axis L of the imaging optical system.

<Configuration (1) of Optical Member>

As described later, the optical member 130 comprises a frame (frame), optical filters (color filters, a plurality of optical filters), polarizing filters (a plurality of polarizing filters), and dark filters (dark filters). The optical member 130 can be inserted into and removed from the lens barrel 102, and optical members having different characteristics can be used according to the characteristics of a light source (subject). As a result, the amount of light emitted from the imaging optical system is adjusted and/or can be adjusted for each of a plurality of aperture regions. Keeping the output (sensitivity) from the imaging element 210 constant or in a specified range over a plurality of wavelength ranges so as to correspond to the aperture regions 132A to 132D, in a case where the lens device 100 is mounted on the imaging apparatus body 200, can be called "adjustment". Further, characteristics determined depending on the spectrum of a subject (light source), the spectroscopic transmittance of the lenses (the first lens 110, the second lens 120), the transmission wavelength characteristics of the filters (optical filters, polarizing filters), and a relationship between a wavelength range and the output of the image sensor (imaging element 210) can be called "sensitivity".

In general, since the sensitivity of an image sensor alone is determined in the manufacturing process and the spectrum of a subject also depends on the properties of the subject, it is difficult to change these during imaging. From this point of view, in the present invention, the pupil of the lens is divided for each wavelength range, and a spectral image (an image corresponding to the wavelength range of the optical filter) is generated on the basis of polarization information associated with each wavelength range. Accordingly, it is possible to change a light amount ratio between wavelength ranges by adjusting the amount of light for each pupil of the lens. Further, since it is possible to simultaneously acquire spectral images without the deviation of the optical axis (imaging direction), it is not necessary to perform imaging plural times unlike in the technique disclosed in WO2014/020791A described above. For this reason, multispectral images having a good image quality can be easily acquired (the same applies to the case of the optical member of an aspect to be described later).

Figure 8:
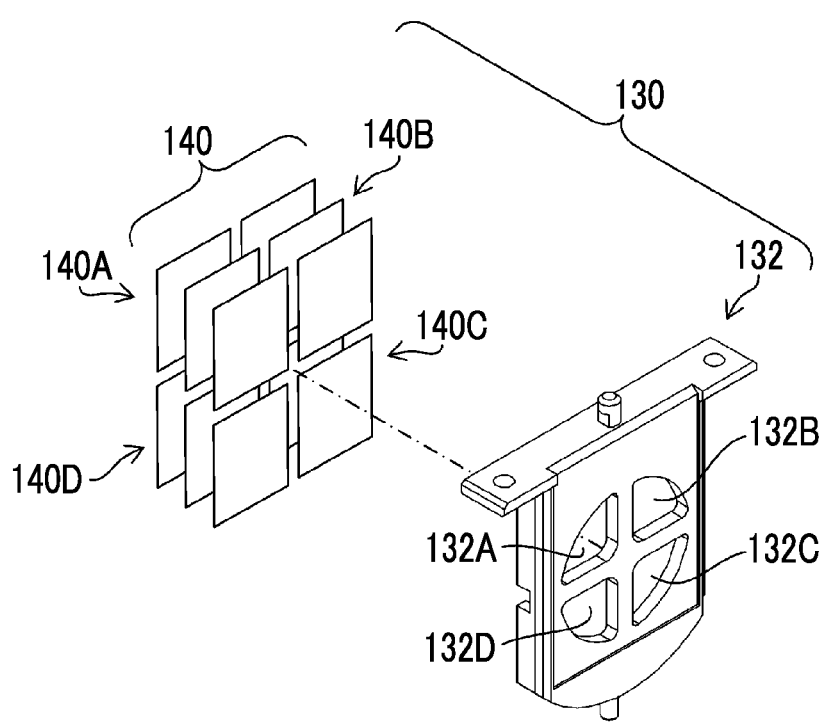
FIG. 8 is a diagram showing a configuration example of an optical member.

FIGS. 7A to 7F are diagrams showing the appearance of the frame 132, and FIG. 8 is a diagram showing a configuration example of the optical member. Specifically, FIGS. 7A to 7F are a rear view, a top view, a left side view, a bottom view, a perspective view, and a front view, respectively. As shown in FIGS. 7E and 7F, the frame 132 comprises four aperture regions 132A to 132D (a plurality of aperture regions). The shape of each of the aperture regions 132A to 132D is not limited to a fan shape, and may be another shape, such as a circular shape, a rectangular shape, or a polygonal shape (the same applies to other aspects to be described later). As shown in FIGS. 7A and 8, filter sets 140A to 140D (optical filters (color filters), polarizing filters, and dark filters) are disposed in these aperture regions (the back side of the frame 132), respectively. The filter sets 140A to 140D may be fixed using an adhesive.

Figure 9A:
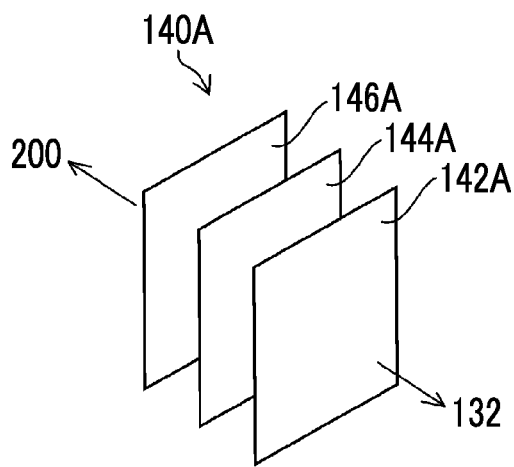
FIGS. 9A to 9D are diagrams showing configuration examples of filter sets.
Figure 9B:
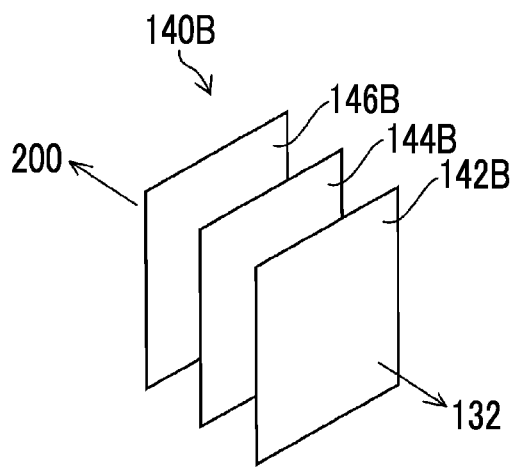
Figure 9C:
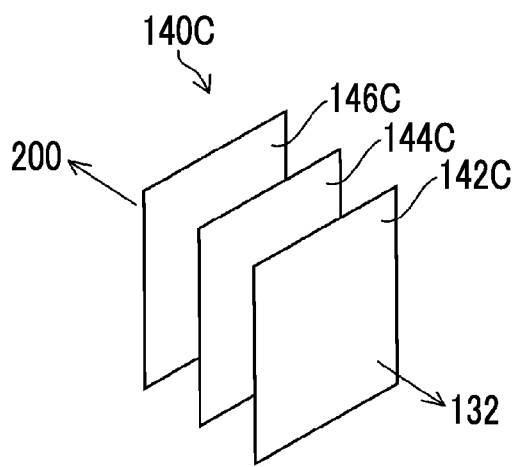
Figure 9D:
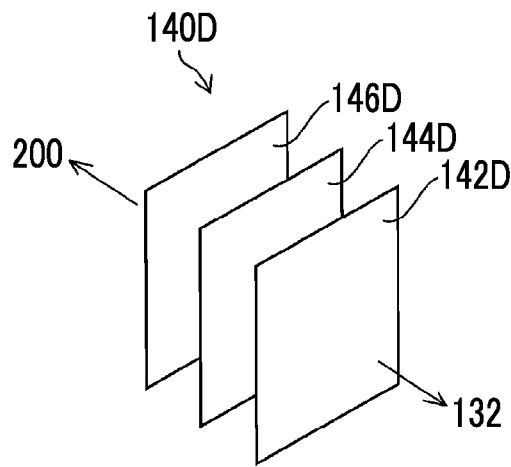
Figure 10A:
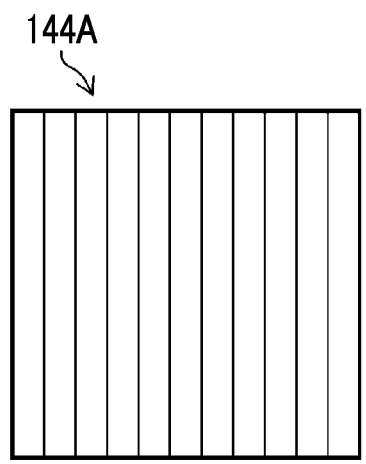
FIGS. 10A to 10D are diagrams showing examples of the polarization directions of polarizing filters.
Figure 10B:
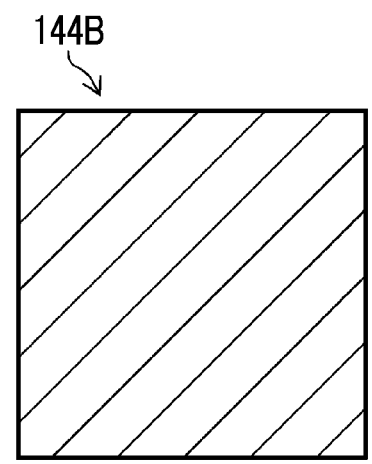
Figure 10C:
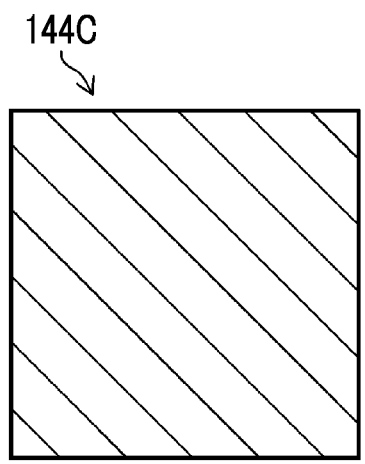
Figure 10D:
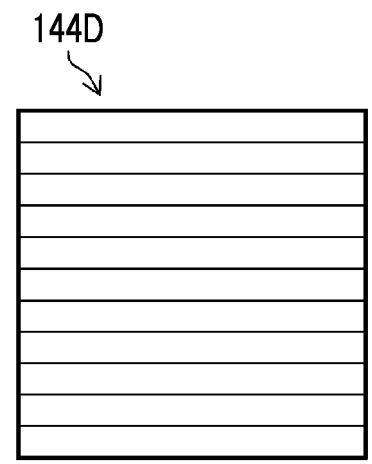

FIGS. 9A to 9D are diagrams showing configuration examples of the filter sets 140. Specifically, the filter set 140A has a configuration in which an optical filter 142A, a polarizing filter 144A, and a dark filter 146A are superimposed as shown in FIG. 9A. Likewise, the filter set 140B has a configuration in which an optical filter 142B, a polarizing filter 144B, and a dark filter 146B are superimposed as shown in FIG. 9B. Likewise, the filter set 140C has a configuration in which an optical filter 142C, a polarizing filter 144C, and a dark filter 146C are superimposed as shown in FIG. 9C. Likewise, the filter set 140D comprises an optical filter 142D, a polarizing filter 144D, and a dark filter 146D as shown in FIG. 9D.

The optical filters 142A to 142D are a plurality of optical filter (band-pass filters) that transmit light having at least some wavelength ranges different from each other, the polarizing filters 144A to 144C are a plurality of polarizing filters having different polarization directions, and the dark filters 146A to 146D are dark filters that dim light transmitted through the aperture regions 132A to 132D. FIGS. 10A to 10D are diagrams showing examples of the polarization directions of the polarizing filters. As illustrated in FIGS. 10A to 10D, the polarization directions of the polarizing filters 144A to 144D are four directions (of which the number is equal to the number of the aperture regions; for example, 0°, 45°, 90°, and 135°) at most. Each of the polarizing filters 144A to 144D may be a filter that polarizes light using a polarizing film or may be a filter that polarizes light using wire grids or a plurality of slits.

The dark filters 146A to 146D are filters that dim light transmitted through the aperture regions 132A to 132D. For example, a neutral density (ND) filter can be used as the dark filter. The degrees of dimming of the dark filters 146A to 146D may be different for some or all filters, and a user can use a dark filter having a selected degree of dimming to adjust a light amount ratio between the aperture regions 132A to 132D.

Since the light amount ratio of the optical member 130 shown in FIGS. 8 and 9A to 9D can be adjusted in a manufacturing step, the optical member 130 is effective for acquiring a multispectral image having a good image quality. Further, the stiffness of the optical member can be increased. Furthermore, since the aperture areas of the aperture regions 132A to 132D are not adjusted in the optical member 130, the brightness of an image to be generated can be ensured and the optical member 130 is effective in a case where a user wants to reduce the depth of field or a case where a user wants to prevent an image blur caused by a small stop.

<Configuration (2) of Optical Member>

Figure 11A:
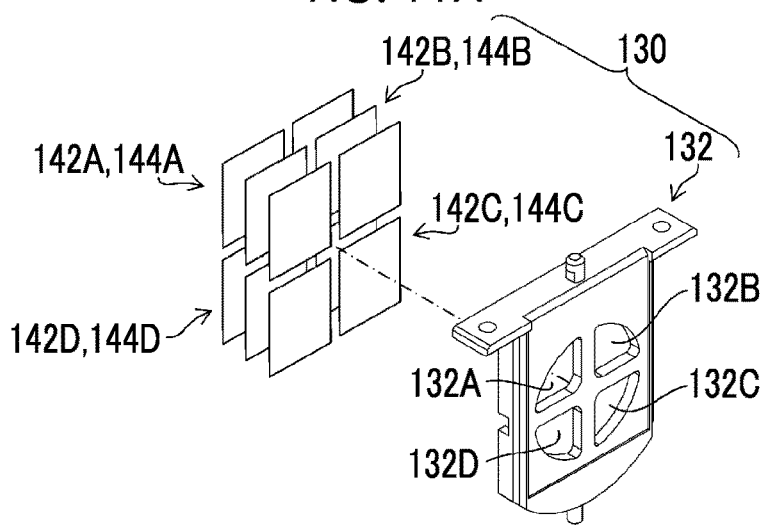
FIGS. 11A to 11C are diagrams showing other configuration examples of the optical member.
Figure 11B:
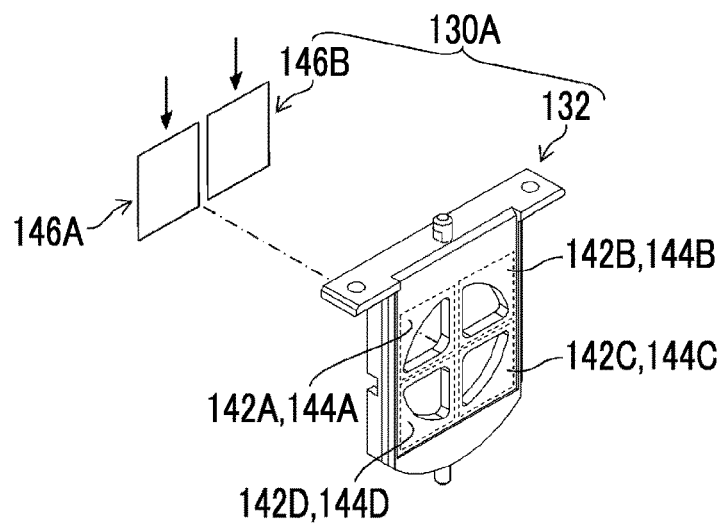
Figure 11C:
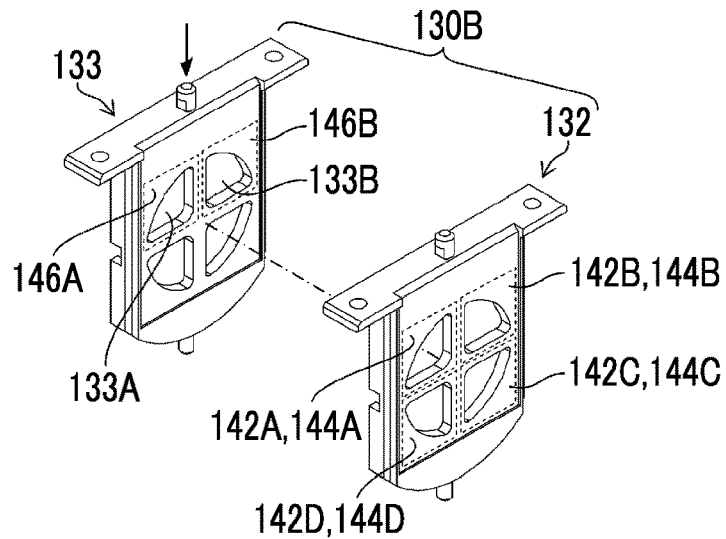

FIGS. 11A to 11C are diagrams showing other configuration examples of the optical member. In the above-mentioned example shown in FIGS. 8, 9A to 9D, and the like, the filter sets 140A to 140D are disposed in the aperture regions 132A to 132D, respectively. However, in examples shown in FIGS. 11A to 11C, the optical filters and the polarizing filters are disposed in the aperture regions 132A to 132D and the dark filters are separately inserted into the lens barrel 102.

Specifically, as shown in FIG. 11A, the optical filter 142A and the polarizing filter 144A are disposed in the aperture region 132A. Likewise, the optical filter 142B and the polarizing filter 144B are disposed in the aperture region 132B, the optical filter 142C and the polarizing filter 144C are disposed in the aperture region 132C, and the optical filter 142D and the polarizing filter 144D are disposed in the aperture region 132D. Then, the dark filters 146A and 146B are disposed (inserted into the slit 108) as shown in FIG. 11B in a state where the optical filters and the polarizing filters are disposed, so that an optical member 130A is formed. The dark filters may be inserted for some aperture regions of the four aperture regions 132A to 132D, or may be inserted for all of the aperture regions. The dark filters may not be directly inserted and may be inserted in a state where the dark filters are disposed (adhere or the like) on the frame 132. Further, the degrees of dimming of the dark filters may be selected according to a desired light amount ratio.

According to such an aspect, a user can insert dark filters for the required aperture regions to adjust a light amount ratio between the aperture regions. Further, since a user can give feedback on a light amount ratio, it is possible to adjust the amount of light according to the usage environment (the type of a subject, the characteristics of a light source, the purpose of usage of an image, or the like) for each user. As a result, it is possible to acquire multispectral images having a good image quality under a higher condition number.

As shown in FIGS. 11A and 11B, the dark filters themselves are not disposed and the dark filters are disposed on a frame and the frame may be inserted. For example, as shown in FIG. 11C, the dark filters 146A and 146B may be disposed in aperture regions 133A and 133B to form a frame 133 and the frame 133 may be disposed to be close to the frame 132 (near the pupil). As a result, an optical member 130B is formed.

<Configuration (3) of Optical Member>

Figure 12:
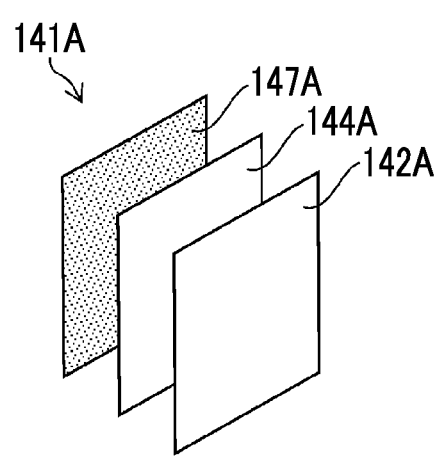
FIG. 12 is a diagram showing a configuration example of an optical member in which the degree of dimming of a dark filter is variable.

In the present invention, the degree of dimming of a dark filter may be variable. FIG. 12 is a diagram showing a configuration example of an optical member in which the degree of dimming of a dark filter is variable, and shows a filter set 141A that includes a dark filter 147A (variable dark filter) having a variable degree of dimming in addition to the optical filter 142A and the polarizing filter 144A. Such a variable dark filter may be disposed in some aperture regions or may be disposed in all of the aperture regions. A plurality of dark filters may be superimposed to form a variable dark filter, and the plurality of dark filters can be rotated relative to each other to adjust the degree of dimming. Further, a dark filter can be formed using a liquid crystal display element, and it is also possible to adjust the degree of dimming by adjusting the transmittance of liquid crystal.

According to such an aspect, since a user can actively adjust a light amount ratio, the user can easily obtain an optimum light amount ratio (condition number) depending on a situation even in an environment, such as outside light of which the spectrum is changed between the morning and the evening and in the daytime. Accordingly, it is possible to acquire multispectral images having a good image quality.

<Configuration (4) of Optical Member>

Figure 13A:
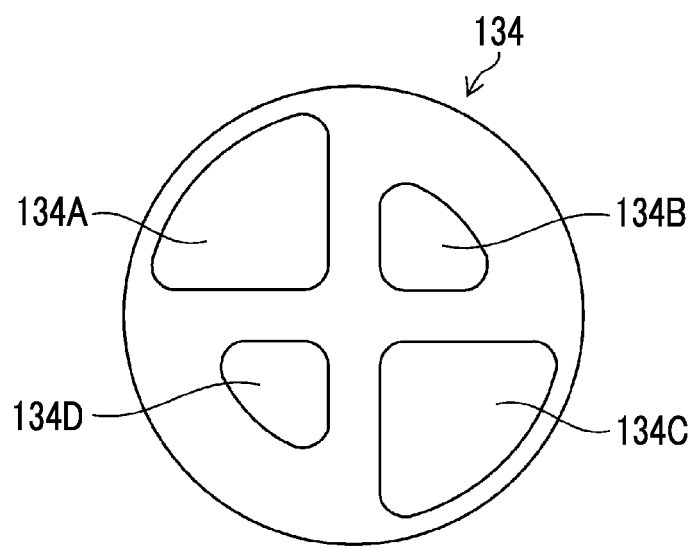
FIGS. 13A and 13B are diagrams showing an example of an adjustment member.
Figure 13B:
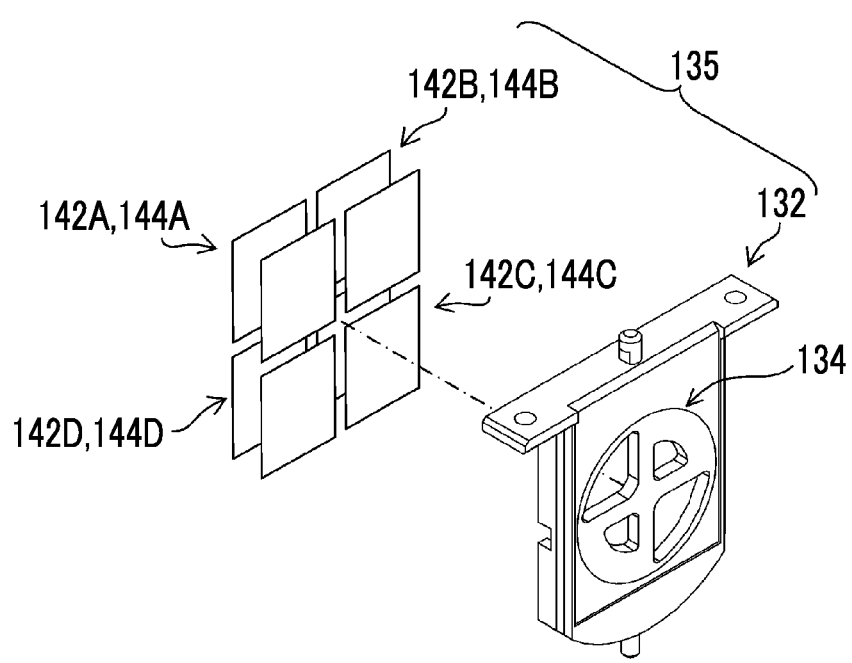

The aperture areas of the aperture regions are the same in the above-mentioned aspects, but an aperture area may be different between the aperture regions in the present invention. FIGS. 13A and 13B are diagrams showing an example of an adjustment member (a pupil dividing frame in which the aperture area of each pupil is adjusted), and the aperture areas may be adjusted (the aperture regions of the frame may be narrowed) using such an adjustment member. As shown in FIG. 13A, the adjustment member 134 includes aperture regions 134A to 134D that adjust the aperture areas of the aperture regions 132A to 132D of the frame 132. As shown in FIG. 13B, the adjustment member 134 is disposed on the front surface (which may be the rear surface) of the frame 132 and the optical filters 142A to 142D and the polarizing filters 144A to 144D are disposed on the frame 132, so that an optical member 135 is formed. The adjustment member 134 on which the optical filters and the polarizing filters are disposed may be mounted on the frame 132.

The aperture areas of the aperture regions 134A to 134D may be different for each aperture. Further, the adjustment member 134 may be a member that adjusts the aperture area of one aperture region, or may be a member that is disposed in a plurality of aperture regions and adjusts the aperture areas of the plurality of aperture regions. The shape of the adjustment member 134 may not be a circular shape and may be another shape, such as a rectangular shape or a polygonal shape.

According to such an aspect, it is possible to adjust (narrow) the aperture area and it is effective in a case where a user wants to increase the depth of field.

<Configuration (5) of Optical Member>

Figure 14A:
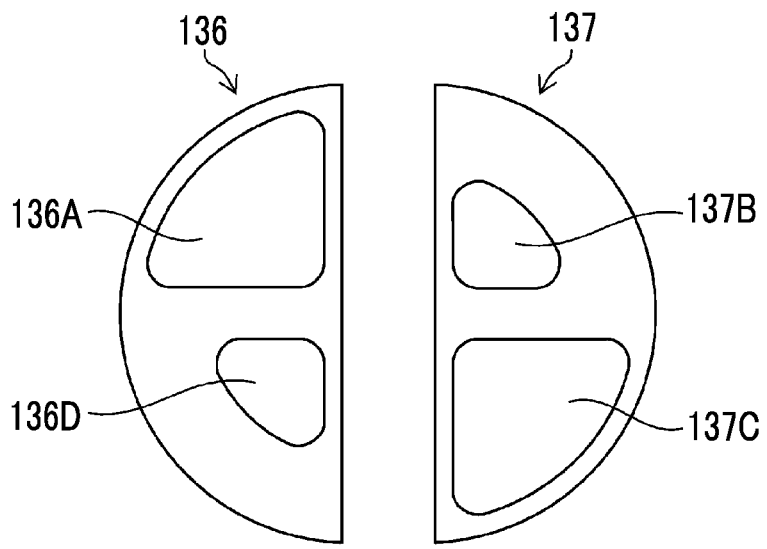
FIGS. 14A and 14B are diagrams showing another example of the adjustment member.
Figure 14B:
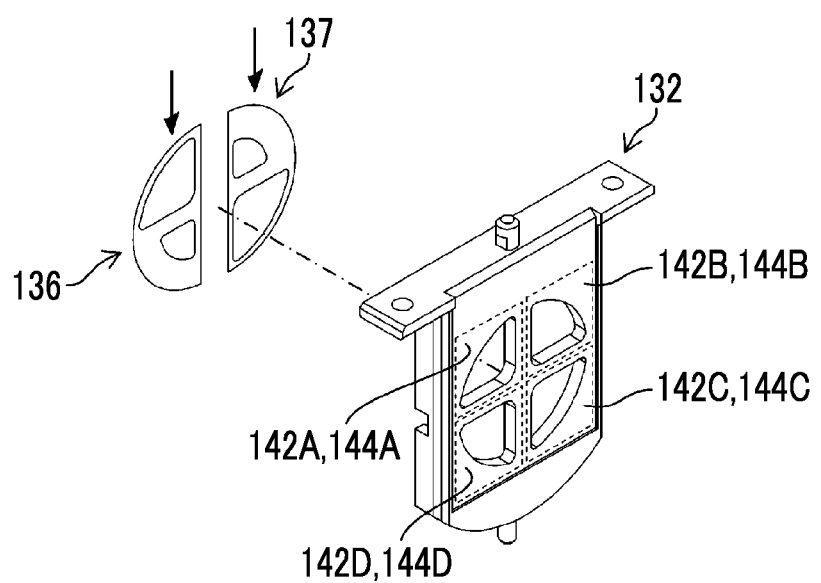

FIGS. 14A and 14B are diagrams showing another example of the adjustment member. An adjustment member 136 (an optical member, a variable mechanism) provided with aperture regions 136A and 136D and an adjustment member 137 (an optical member, a variable mechanism) provided with aperture regions 137B and 137C are shown in FIGS. 14A and 14B. The aperture areas of these aperture regions may be different from each other, or different aperture areas can be set according to a desired light amount ratio. A plurality of adjustment members having different aperture areas may be prepared and a user may select an adjustment member according to a light amount ratio. The adjustment member may be a member that adjusts the aperture area of one aperture region or may be a member that is disposed in a plurality of aperture regions and adjusts the aperture areas of the plurality of aperture regions. Further, the adjustment member may be divided into a plurality of pieces as in the example shown in FIGS. 14A and 14B, or may be formed of one member.

In a case where the adjustment members 136 and 137 are used, the optical filters 142A to 142D and the polarizing filters 144A to 144D are disposed on the frame 132, the adjustment members 136 and 137 are inserted into the lens barrel 102, and the aperture regions 136A, 137B, 137C, and 136D are made to correspond to the aperture regions 132A to 132D of the frame 132.

<Configuration (6) of Optical Member>

Figure 15:
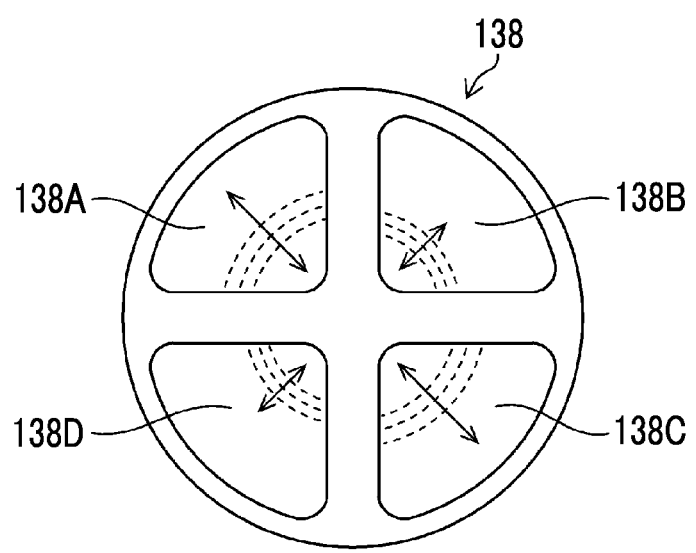
FIG. 15 is a diagram showing an example of an optical member that comprises a variable mechanism for changing the areas of aperture regions.

FIG. 15 is a diagram showing an example of an optical member that comprises a variable mechanism for changing the areas of aperture regions. An optical member 138 (a variable mechanism, an optical member) shown in FIG. 15 includes a plurality of aperture regions 138A to 138D, and can change the aperture areas of these aperture regions. The aperture area may be electrically changed using the adjustment of the area of the light-shielding region of the liquid crystal display element (not shown), or may be mechanically changed using the movement of a pinnate member, a plate-shaped member (not shown), or the like. The image generation unit 234 (processor) makes such a change according to a light amount ratio.

In a case where the optical member 138 is used, the optical filters and the polarizing filters can be disposed on the frame 132 as in the example shown in FIGS. 14A and 14B, the optical member 138 can be disposed thereon, and the aperture regions 138A to 138D can be made to correspond to the aperture regions 132A to 132D. The optical filters and the polarizing filters and the optical member 138 may be disposed on the different surfaces (the object side and the imaging apparatus body 200 side) of the frame 132.

The optical member 138 shown in FIG. 15 is a member that can change the aperture areas of the aperture regions 132A to 132D, but an optical member that can change the area of at least one aperture region of the aperture regions 132A to 132D may be used.

In a case where such an optical member 138 is used, a light amount ratio can be actively changed as in the above-mentioned "Configuration (3) of optical member" and the depth of field can be increased using the change of an aperture area as in "Configuration (4) of optical member".

<Configuration (Others) of Optical Member>

A case where the aperture regions (wavelength ranges) and the polarization directions are four types has been described in the optical members having the above-mentioned configuration, but the aperture regions and the polarization directions may be three or less types. The reason for this is that only images in three wavelength ranges corresponding to three polarization directions even at most can be separated in a case where an imaging element of which the polarization directions of polarizing filter elements are four types is used as a monochrome imaging element (without color filters), such as the imaging element 210. In a case where the number of aperture regions is three, optical filters having the same wavelength range and polarizing filters having the same polarization direction may be disposed in two aperture regions of the four aperture regions and one aperture may be shielded by a shielding member. Further, a frame comprising three aperture regions may be used.

Figure 16A:
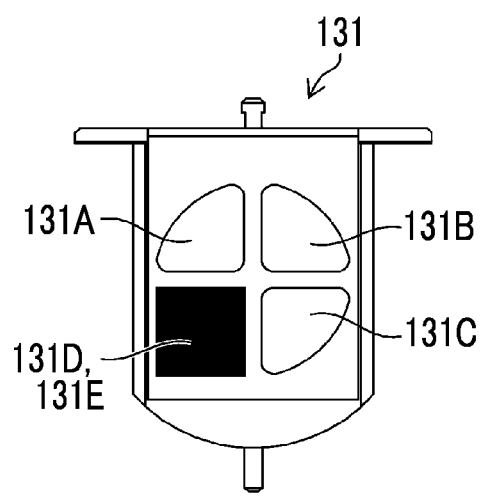
FIGS. 16A and 16B are diagrams showing the examples of arrangement of aperture regions in the case of three wavelengths.
Figure 16B:
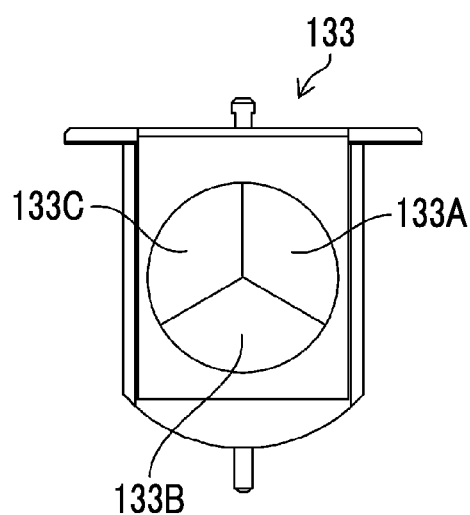

FIGS. 16A and 16B are diagrams showing the examples of arrangement of aperture regions in the case of three wavelengths. FIG. 16A shows a frame 131 in a state where one (aperture region 131D) of four aperture regions 131A to 131D is shielded by a shielding member 131E, and FIG. 16B shows a frame 133 in which three aperture regions 133A to 133C are formed. An aperture area may be different between the aperture regions. Even in these aspects, optical filters (color filters), polarizing filters, and dark filters can be disposed in the aperture regions as in the above-mentioned aspects. Not only in a case where the number of aperture regions to be used is four but also in a case where the number of aperture regions to be used is three or less, optical filters may be disposed in at least one of the plurality of aperture regions and some aperture regions may be open (not provided with optical filters).

<Image Generation Processing>

Next, image generation processing (imaging method) using the lens device 100 and the imaging apparatus body 200 having the above-mentioned configuration will be described. Here, in the optical member, the wavelength ranges of the optical filters are three types ($\lambda1$ to $\lambda3$), the polarization directions are also three types (for example, 0°, 45°, and 90°), and the polarization directions of the imaging element 210 are four types (0°, 45°, 90°, and 135°). For example, the frame 131 (the aperture region 131D is shielded) shown in FIG. 16A is used in this case.

<Coefficient Group for Removing Interference>

In order to obtain images corresponding to the wavelength ranges (λ1 to λ3), it is necessary to separate and extract pixel signals, which correspond to the respective wavelength ranges, from the respective pixels of the imaging element 210. However, interference (cross talk) occurs in these image data. That is, since light having the respective wavelength ranges is incident on the respective pixels, an image to be generated is an image in which images corresponding to the wavelength ranges λ1 to λ3 are mixed. For this reason, the image generation unit 234 performs interference removal processing to generate image data corresponding to the respective wavelength ranges (λ1 to λ3).

A ratio (interference ratio) at which light having the respective wavelength ranges λ1 to λ3 and emitted from the lens device 100 is received by the respective pixels can be uniquely determined from the setting of the wavelength ranges λ1 to λ3 of light transmitted by the optical filters 142A to 142C, the setting of the polarization directions of light transmitted by the polarizing filters 144A to 144C, and the setting of the polarization directions (four directions) of light received by the respective pixels of the imaging element 210; and can be obtained in advance. The image generation unit 234 can calculate this interference ratio from a plurality of images, which are acquired in a state where any one of a plurality of shielding members is mounted on the lens device, using the plurality of shielding members that shield aperture regions other than a specific aperture region among a plurality of aperture regions.

Figure 17A:
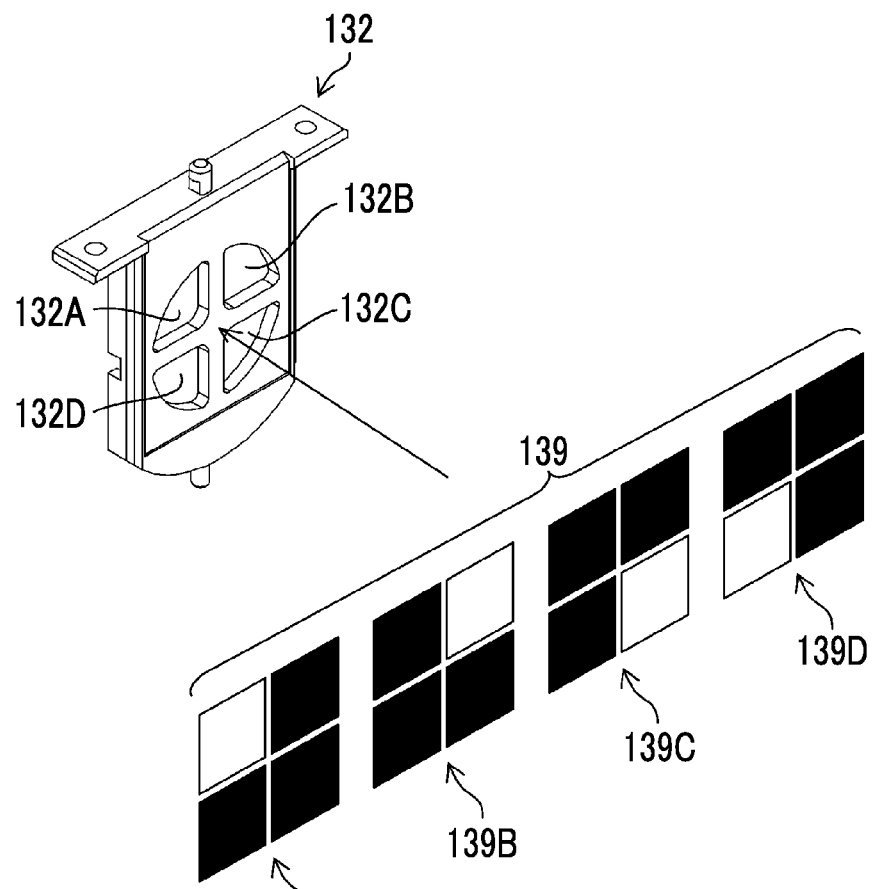
FIGS. 17A and 17B are diagrams showing aspects in which a shielding member is mounted on the frame.
Figure 17B:
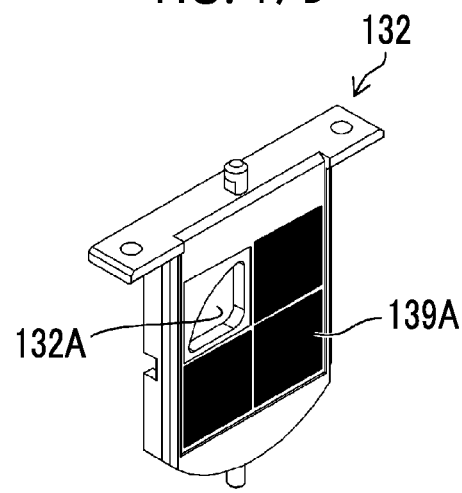

FIGS. 17A and 17B are diagrams aspects in which a shielding member is mounted on the frame 132. As shown in FIG. 17A, a shielding member 139 comprises a plurality of shielding members each of which opens any one of the aperture regions 132A to 132D of the frame 132 and shields the other aperture regions. Specifically, each of the shielding members 139A to 139D shields aperture regions other than each of the aperture regions 132A, 132B, 132C, and 132D (a specific aperture region). FIG. 17B shows the frame 132 on which the shielding member 139A is mounted. In a case where the aperture regions and the polarization directions are three or less types as described above (for example, a case where one or more aperture regions are shielded among four aperture regions or a case where an optical member including three or less aperture regions is used), the shielding members may also be three or less types. A case where the aperture regions and the polarization directions are three or less types will be described.

In this case, imaging is performed using the shielding members 139A to 139C one by one, so that three images corresponding to three wavelength ranges are obtained. The image generation unit 234 calculates coefficient groups (each element of an interference removal matrix) for interference removal processing from these images, and the coefficient storage unit 236 stores these coefficient groups. Further, the image generation unit 234 can calculate a light amount ratio and an optimum value thereof from these images.

The image generation unit 234 acquires coefficient groups from the coefficient storage unit 236, calculates pixel signals corresponding to the respective wavelength ranges λ1 to λ3 from pixel signals obtained from the respective pixels by using Equation 1, and generates image data corresponding to the respective wavelength ranges λ1 to λ3. The image data corresponding to the respective wavelength ranges λ1 to λ3, which are generated by the image generation unit 234, are output to the outside and are stored in a storage device (not shown) as necessary. Further, the image data are displayed on a display (not shown) as necessary.

<Adjustment of Light Amount Ratio and Imaging (Case of Manual Adjustment)>

Figure 18:
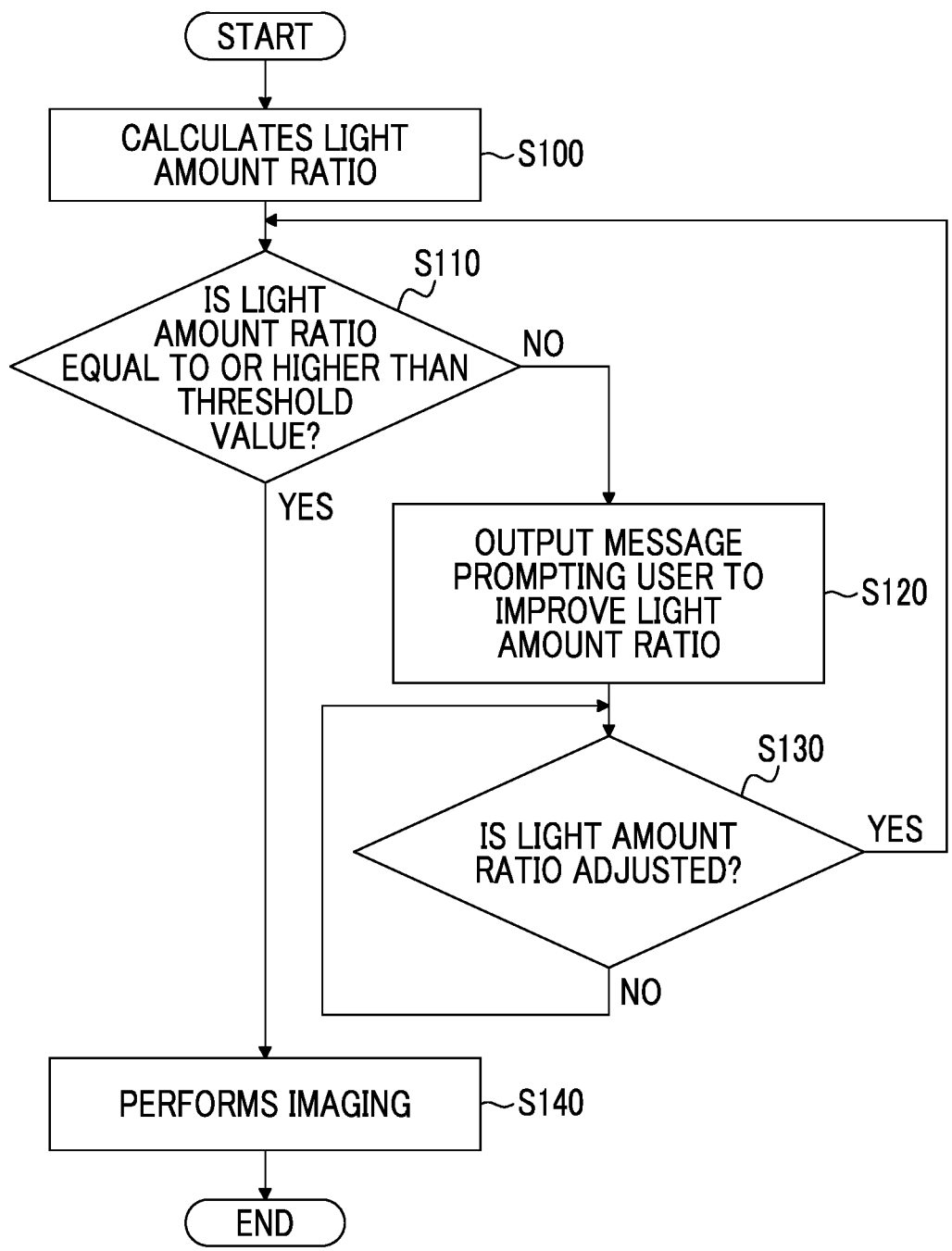
FIG. 18 is a flowchart showing processing for adjusting a light amount ratio and imaging.

Next, processing (each processing of an imaging method) for adjusting a light amount ratio to generate a multispectral image will be described. FIG. 18 is a flowchart showing processing for adjusting a light amount ratio and imaging. This flowchart shows processing in a case where a user adjusts a light amount ratio by oneself. Processing is started in a case where imaging (or the calculation of a light amount ratio) is instructed by an operation, such as the release of a shutter (not shown). It is assumed that coefficient groups for removing interference are acquired by using the above-mentioned shielding members.

In a case where imaging is instructed, the image generation unit 234 (processor) calculates a light amount ratio between the wavelength ranges from the image data (a plurality of image signals) corresponding to the respective wavelength ranges λ1 to λ3 (Step S100: information calculation step). The ratio of L1, L2, and L3 appearing in the following Equations (1) to (5) is a light amount ratio. The image generation unit 234 may calculate condition numbers (the following N1 to N3) related to the amount of light without directly calculating a light amount ratio.

$$Img0 = L1 * \cos^2(0-\theta1) + L2 * \cos^2(0-\theta1) + L3 * \cos^2(0-\theta3) \quad (1)$$

$$Img45 = L1 * \cos^2(45-\theta1) + L2 * \cos^2(45-\theta1) + L3 * \cos^2(45-\theta3) \quad (2)$$

$$Img90 = L1 * \cos^2(90-\theta1) + L2 * \cos^2(90-\theta1) + L3 * \cos^2(90-\theta3) \quad (3)$$

$$Img135 = L1 * \cos^2(135-\theta1) + L2 * \cos^2(135-\theta1) + L3 * \cos^2(135-\theta3) \quad (4)$$

$$\begin{bmatrix} N1 \\ N2 \\ N3 \end{bmatrix} = \begin{bmatrix} Img0 \\ Img45 \\ Img90 \\ Img135 \end{bmatrix} * \mathrm{abs}[A]^{-1} \quad (5)$$

In Equations (1) to (5), L1 to L3 denote the amounts of light in the respective wavelength ranges (λ1 to λ3), θ1 to θ3 denote polarization angles (0°, 45°, and 90°) assigned to the respective wavelengths, N1 to N3 denote condition numbers given to the respective wavelengths, and S1 to S3 denote signals corresponding to the respective wavelengths. In a case where "L1>>L2>>L3" is satisfied, "N1<<N2<<N3" is satisfied (A condition number is smaller as the amount of light is larger.)

The image generation unit 234 (processor) determines whether or not a light amount ratio is equal to or higher than a threshold value. In this case, this determination may be made for one of L1 to L3 described above or a combination of a plurality of the amounts of light, or may be made for the maximum and minimum of L1 to L3. The image generation unit 234 may set the threshold value on the basis of a user's operation or may set the threshold value regardless of a user's operation. Further, the image generation unit 234 may set the threshold value on the basis of a relationship (a ratio or the like) with the optimum value of a light amount ratio. In a case where a light amount ratio is equal to or higher than the threshold value (YES in Step S110), the image generation unit 234 generates a plurality of images in the wavelength ranges (λ1 to λ3) of the optical filters, respectively (multispectral images in three wavelengths) (Step S140: image generation step).

On the other hand, in a case where a light amount ratio is lower than the threshold value (NO in Step S110), the image generation unit 234 outputs a message prompting the user of the imaging apparatus 10 to improve the light amount ratio (Step S120: improvement request step). The image generation unit 234 can output, for example, a message "Please reduce the amount of light in Aperture region No. 1" via a monitor (display device) or a speaker (voice output device) (not shown). The image generation unit 234 may output a specific adjustment method, such as "Please reduce the aperture area by one step" or "Please increase the degree of dimming by one step". Alternatively, the image generation unit 234 may output a message "Please increase the amount of light in Aperture region No. 3" in a case where the aperture area has been excessively reduced, in a case where the degree of dimming has been excessively reduced, or the like. The image generation unit 234 may output information indicating a specific value of the amount of light or a light amount ratio and/or information indicating condition numbers via a device, such as a monitor or a speaker.

In a case where the user adjusts a light amount ratio according to the message and the lens device 100 is mounted on the imaging apparatus body 200 including the imaging element 210, the user can make an adjustment for keeping an output from the imaging element 210 constant (alternatively, in a desired range) over the wavelength ranges.

In a case where the user adjusts a light amount ratio (YES in Step S130), the image generation unit 234 determines whether or not alight amount ratio adjusted in Step S110 is equal to or higher than the threshold value (alternatively, the image generation unit 234 determines whether or not an output from the imaging element 210 is constant or in a specified range over the wavelength ranges) again. In a case where a light amount ratio is equal to or higher than the threshold value, the image generation unit 234 performs imaging in Step S140 (image generation step).

In the imaging apparatus 10, such processing makes it possible to easily acquire multispectral images having a good image quality.

<Adjustment of Light Amount Ratio and Imaging (Case of Automatic Adjustment)>

Figure 19:
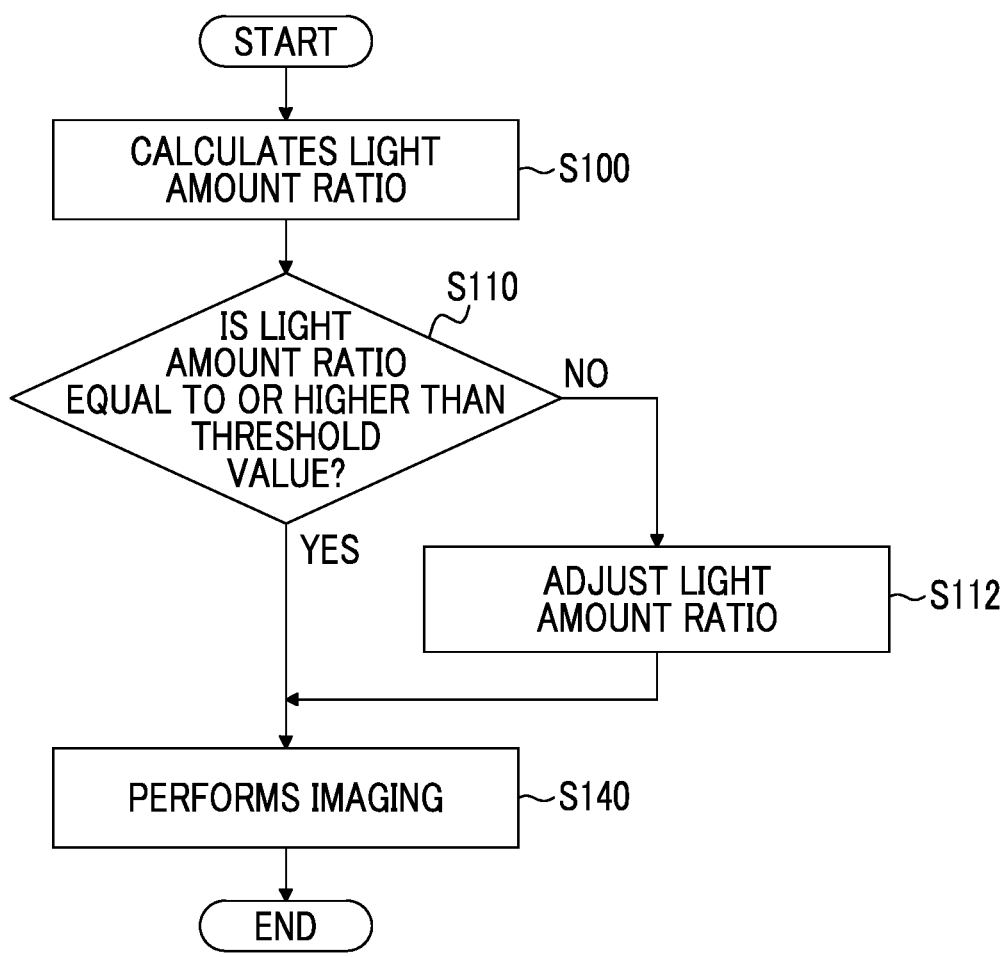
FIG. 19 is another flowchart showing processing for adjusting a light amount ratio and imaging.

FIG. 19 is another flowchart showing processing for adjusting a light amount ratio and imaging. This flowchart shows processing in a case where the image generation unit 234 adjusts a light amount ratio regardless of a user's operation. Accordingly, the image generation unit 234 can perform processing shown in the flowchart of FIG. 19 in a case where the imaging apparatus 10 comprises dark filters (see FIG. 12 and the like) of which the degrees of dimming are variable and/or an optical member (see FIG. 15 or the like) of which the aperture areas are variable.

As in a case where a light amount ratio is manually adjusted, processing is started in a case where imaging (or the calculation of a light amount ratio) is instructed by an operation, such as the release of a shutter (not shown). Further, it is assumed that coefficient groups for removing interference are acquired by using the above-mentioned shielding members.

The processing of Steps S100 and S110 is the same as that of the flowchart of FIG. 18. In a case where a light amount ratio is lower than the threshold value (NO in Step S110), the image generation unit 234 changes the degree of dimming of the dark filter and/or the aperture area of the optical member for one or a plurality of aperture regions to adjust a light amount ratio (Step S112: light amount-adjustment step). As in a case where a light amount ratio is manually adjusted, the image generation unit 234 can make an adjustment for keeping an output from the imaging element 210 constant (alternatively, in a range corresponding to a user's operation) over the wavelength ranges and can output information indicating a light amount ratio, condition numbers, or the like at the time of adjustment of a light amount ratio.

In the imaging apparatus 10, such processing makes it possible to easily acquire multispectral images having a good image quality.

<Case of Imaging Apparatus Comprising Color Imaging Element>

In the present invention, the imaging element may be a color imaging element. The color imaging element may comprise color filter layers, which are composed of a plurality of color filters (a plurality of color filters), for a plurality of wavelength ranges corresponding to the wavelength ranges of color filters of the lens device. The wavelength ranges of the color filters of the imaging element can be set to, for example, four types and polarizing filters having four types of polarization directions are disposed so as to correspond to a color filter having one type of wavelength range. In a case where such a color imaging element is combined with a lens device that includes an optical member having four types of wavelength ranges and four types of polarization directions as described above, it is possible to adjust a light amount ratio for four wavelengths and to easily acquire multispectral images having a good image quality. The wavelength ranges can be set to four types of blue, green, red, and near infrared, and the image generation unit 234 can combine the four types of images in such wavelength ranges into one image. Further, the image generation unit 234 may generate a color image by combining images in the wavelength ranges of blue light, green light, and red light. It is preferable that coefficient groups are acquired in advance from imaging using shielding members as described above with reference to FIGS. 17A and 17B in a case where an image is to be generated.

The embodiments and other examples of the present invention have been described above, but the present invention is not limited to the above-mentioned aspects and can have various modifications without departing from the scope of the present invention.

EXPLANATION OF REFERENCES

10: imaging apparatus
100: lens device
102: lens barrel
104: first lever
106: second lever
108: slit
110: first lens
120: second lens
130: optical member
130A: optical member
130B: optical member
131: frame
131A: aperture region
131B: aperture region
131C: aperture region
131D: aperture region
131E: shielding member
132: frame
132A: aperture region
132B: aperture region 132C: aperture region
132D: aperture region
133: frame
133A: aperture region
133B: aperture region
133C: aperture region
134: adjustment member
134A: aperture region
134B: aperture region
134C: aperture region
134D: aperture region
135: optical member
136: adjustment member
136A: aperture region
136D: aperture region
137: adjustment member
137B: aperture region
137C: aperture region
138: optical member
138A: aperture region
138B: aperture region
138C: aperture region
138D: aperture region
139: shielding member
139A: shielding member
139B: shielding member
139C: shielding member
139D: shielding member
140: filter set
140A: filter set
140B: filter set
140C: filter set
140D: filter set
141A: filter set
142A: optical filter
142B: optical filter
142C: optical filter
142D: optical filter
144A: polarizing filter
144B: polarizing filter
144C: polarizing filter
144D: polarizing filter
146A: dark filter
146B: dark filter
146C: dark filter
146D: dark filter
147A: dark filter
200: imaging apparatus body
210: imaging element
211: pixel array layer
212: photodiode
213: polarizing filter element-array layer
214A: polarizing filter element
214B: polarizing filter element
214C: polarizing filter element
214D: polarizing filter element
215: microlens array layer
216: microlens
230: signal processing unit
232: analog signal processing unit
234: image generation unit
236: coefficient storage unit
L: optical axis
S100 to S140: respective steps of imaging method

What is claimed is:

1. A lens device comprising:
an imaging optical system that includes a lens forming an optical image of a subject, and a lens barrel in which the lens is disposed; and
an optical member that is disposed near a pupil of the imaging optical system in a state where an optical axis of the optical member coincides with an optical axis of the imaging optical system, and includes a frame that includes a plurality of aperture regions, a plurality of optical filters that are disposed in at least one of the plurality of aperture regions and include two or more optical filters transmitting light having at least some wavelength ranges different from each other, and a plurality of polarizing filters that are disposed in at least one of the plurality of aperture regions and have different polarization directions,
wherein the lens barrel has a slit at a position near the pupil of the imaging optical system, and the optical member is insertable into and removable from the imaging optical system through the slit.

2. The lens device according to claim 1, further comprising:
an adjustment member that is disposed in the at least one aperture region and adjusts an aperture area of the aperture region.

3. The lens device according to claim 2,
wherein the adjustment member is disposed in the plurality of aperture regions.

4. The lens device according to claim 2,
wherein the adjustment member makes the aperture area variable.

5. The lens device according to claim 1, further comprising:
a dark filter that is disposed in at least one aperture region of the plurality of aperture regions and dims light transmitted through the at least one aperture region.

6. The lens device according to claim 5,
wherein the dark filter is disposed in each of the plurality of aperture regions.

7. The lens device according to claim 5,
wherein a degree of dimming of the dark filter is variable.

8. The lens device according to claim 5,
wherein the optical member is an optical member in which the optical filters and the polarizing filters are fixed to the plurality of aperture regions, and
the dark filter is inserted into at least one aperture region of the plurality of aperture regions.

9. An imaging apparatus comprising:
the lens device according to claim 1;
an imaging element that includes a plurality of polarizing elements having polarization directions corresponding to the polarization directions of the plurality of polarizing filters and a plurality of pixel groups selectively receiving light transmitted through any one of the plurality of aperture regions; and
a processor that generates a plurality of images corresponding to the wavelength ranges of the plurality of optical filters, respectively, on the basis of a plurality of image signals output from the imaging element.

10. The imaging apparatus according to claim 9,
wherein the processor calculates a light amount ratio between the wavelength ranges on the basis of the plurality of image signals.

11. The imaging apparatus according to claim 10,
wherein the processor prompts a user to improve the light amount ratio in a case where the light amount ratio is lower than a threshold value.

12. The imaging apparatus according to claim 10,
wherein the processor adjusts an amount of light emitted from the plurality of aperture regions on the basis of the light amount ratio.

13. The imaging apparatus according to claim 10, further comprising:
a plurality of shielding members that correspond to the plurality of aperture regions, respectively, and shield aperture regions other than a specific aperture region among the plurality of aperture regions,
wherein the processor calculates the light amount ratio on the basis of the plurality of images that are acquired in a state where any one of the plurality of shielding members is mounted on the lens device.

14. The imaging apparatus according to claim 9,
wherein the imaging element is provided with a plurality of color filters having wavelength ranges corresponding to the wavelength ranges of the plurality of optical filters, and
the processor combines the plurality of images.

15. An imaging method for an imaging apparatus including the lens device according to claim 1, and an imaging element that includes a plurality of polarizing elements having polarization directions corresponding to the polarization directions of the plurality of polarizing filters and a plurality of pixel groups selectively receiving light transmitted through any one of the plurality of aperture regions, the imaging method comprising:
an image generation step of generating a plurality of images corresponding to the wavelength ranges of the plurality of optical filters, respectively, on the basis of a plurality of image signals output from the imaging element.

16. The imaging method according to claim 15, further comprising:
an information calculation step of calculating a light amount ratio between the wavelength ranges on the basis of the plurality of image signals.

17. The imaging method according to claim 16, further comprising:
an improvement request step of prompting a user of the imaging apparatus to improve the light amount ratio in a case where the light amount ratio is lower than a threshold value.

18. The imaging method according to claim 16, further comprising:
a light amount-adjustment step of adjusting an amount of light emitted from the plurality of aperture regions on the basis of the light amount ratio.

19. A non-transitory, computer readable tangible recording medium which records thereon a program which causes, when read by a computer, the computer to execute the imaging method according to claim 15.

* * * * *